United States Patent
Basu Mallick et al.

(10) Patent No.: US 10,917,785 B2
(45) Date of Patent: Feb. 9, 2021

(54) METHOD AND APPARATUS FOR IMPLEMENTING BEARER SPECIFIC CHANGES AS PART OF A CONNECTION RECONFIGURATION THAT IMPACTS THE SECURITY KEYS BEING USED

(71) Applicant: Motorola Mobility LLC, Chicago, IL (US)

(72) Inventors: Prateek Basu Mallick, Langen (DE); Joachim Löhr, Wiesbaden (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 262 days.

(21) Appl. No.: 16/016,592

(22) Filed: Jun. 23, 2018

(65) Prior Publication Data
US 2018/0376332 A1 Dec. 27, 2018

Related U.S. Application Data

(60) Provisional application No. 62/543,817, filed on Aug. 10, 2017, provisional application No. 62/524,379, filed on Jun. 23, 2017.

(51) Int. Cl.
*H04W 12/04* (2009.01)
*H04L 9/08* (2006.01)
(Continued)

(52) U.S. Cl.
CPC ....... *H04W 12/0401* (2019.01); *H04L 9/0819* (2013.01); *H04W 12/0403* (2019.01);
(Continued)

(58) Field of Classification Search
CPC ..... H04W 12/04; H04W 76/25; H04W 76/22; H04W 36/0038; H04W 12/0401; H04W 12/0403; H04L 9/0819; H04L 2209/80
See application file for complete search history.

(56) References Cited

U.S. PATENT DOCUMENTS 10,028,311 B2 7/2018 Yi et al.
10,116,685 B2 * 10/2018 Basu Mallick ....... H04W 12/04
(Continued)

FOREIGN PATENT DOCUMENTS

EP 2574103 A1 3/2013
EP 2928261 A1 * 10/2015 ............ H04W 76/22
(Continued)

OTHER PUBLICATIONS

3GPP, Jun. 2016, 3GPP TS 36.331, V11.16.0 Technical Specification, pp. 1-360.*
(Continued)

*Primary Examiner* — Robert B Leung
*Assistant Examiner* — Thomas Ho
(74) *Attorney, Agent, or Firm* — Loppnow & Chapa

(57) ABSTRACT

A method and apparatus provides a communication connection between a user equipment and a network entity including a plurality of radio bearers having security keys. A connection reconfiguration message is received, which identifies bearer specific changes to be made to a subset of radio bearers including less than all of the plurality of radio bearers, that impact the security keys being used by the subset of radio bearers, where the connection reconfiguration message includes a bearer identification field that identifies the radio bearers included in the subset and a chaining counter. The requested changes are applied to the subset of radio bearers associated with the bearer identification field without resetting the communication connection with the communication network.

19 Claims, 9 Drawing Sheets

(51) Int. Cl.
  *H04W 76/25* (2018.01)
  *H04W 76/22* (2018.01)
  *H04W 36/00* (2009.01)

(52) U.S. Cl.
  CPC ......... *H04W 76/25* (2018.02); *H04L 2209/80* (2013.01); *H04W 36/0038* (2013.01); *H04W 76/22* (2018.02)

(56) References Cited

U.S. PATENT DOCUMENTS

| | | | |
|---|---|---|---|
| 10,555,362 B2* | 2/2020 | Quan | H04W 76/34 |
| 2006/0034205 A1 | 2/2006 | Kim | |
| 2013/0077785 A1* | 3/2013 | Feng | H04W 12/0401 380/44 |
| 2013/0155903 A1* | 6/2013 | Bi | H04L 67/322 370/255 |
| 2013/0170474 A1* | 7/2013 | Bi | H04L 5/0035 370/332 |
| 2014/0241317 A1* | 8/2014 | Jamadagni | H04W 40/36 370/331 |
| 2015/0092696 A1 | 4/2015 | Liu et al. | |
| 2015/0264612 A1* | 9/2015 | Baek | H04W 12/04 370/331 |
| 2016/0065700 A1 | 3/2016 | Yi et al. | |
| 2016/0157101 A1 | 6/2016 | Do et al. | |
| 2016/0234847 A1 | 8/2016 | Zhang et al. | |
| 2016/0285716 A1* | 9/2016 | Pelletier | H04L 43/0811 |
| 2016/0338092 A1 | 11/2016 | Agiwal et al. | |
| 2017/0272985 A1* | 9/2017 | Axen | H01P 1/2005 |
| 2017/0332440 A1* | 11/2017 | Xu | H04W 28/021 |
| 2017/0353992 A1 | 12/2017 | Quan et al. | |
| 2018/0152939 A1 | 5/2018 | Lee et al. | |
| 2018/0247082 A1 | 8/2018 | Durham et al. | |
| 2018/0332554 A1* | 11/2018 | Kawasaki | H04W 80/04 |
| 2018/0376331 A1 | 12/2018 | Löhr et al. | |
| 2019/0124710 A1* | 4/2019 | Stattin | H04W 12/003 |
| 2019/0253895 A1* | 8/2019 | Xu | H04W 36/0061 |
| 2020/0084828 A1 | 3/2020 | Loehr et al. | |

FOREIGN PATENT DOCUMENTS

| | | |
|---|---|---|
| EP | 2928261 A1 | 10/2015 |
| WO | 2013173988 A1 | 11/2013 |
| WO | 2015176462 A1 | 11/2015 |
| WO | 2016119183 A1 | 8/2016 |

OTHER PUBLICATIONS

PCT International Search Report for PCT/US2018/039183, Motorola Mobility LLC, dated—Oct. 8, 2018.
PCT International Search Report for PCT/US2018/039184, Motorola Mobility LLC, dated—Oct. 8, 2018.
3GPP TS 33.401 V15.0.0 (Jun. 2017), 3rd Generation Partnership Project, Technical Specification Group Services and System Aspects, 3GPP System Architecture Evolution (SAE), Security Architecture (Release 15).
3GPP TS 36.323 V14.1.0 (Dec. 2016), 3rd Generation Partnership Project, Technical Specification Group Radio Access Network, Evolved Universal Terrestrial Radio Access (E-UTRA), Packet Data Convergence Protocol (PDCP) Specification (Release 14).
3GPP TS 36.331 V14.3.0 (Jun. 2017), 3rd Generation Partnership Project, Technical Specification Group Radio Access Network, Evolved Universal Terrestrial Radio Access (E-UTRA), Radio Resource Control (RRC), Protocol Specification (Release 14).
3GPP TS 38.322 V0.0.2 (May 2017), 3rd Generation Partnership Project, Technical Specification Group Radio Access Network, NR, Radio Link Control (RLC) Protocol Specification (Release 15).
PTO-892 from Non-Final Office Action, dated Mar. 19, 2020 for U.S. Appl. No. 16/016,590, Löhr et al.

* cited by examiner

METHOD AND APPARATUS FOR
IMPLEMENTING BEARER SPECIFIC
CHANGES AS PART OF A CONNECTION
RECONFIGURATION THAT IMPACTS THE
SECURITY KEYS BEING USED

FIELD OF THE INVENTION

The present disclosure is directed to a method and apparatus for implementing bearer specific changes to a selected subset of bearers, which includes less than all of the existing radio bearers, and more specifically to changes made to the selected subset of bearers as part of a connection reconfiguration that impacts the security keys being used.

BACKGROUND OF THE INVENTION

Presently, user equipment, such as wireless communication devices, communicate with other communication devices using wireless signals. To facilitate the communication, the wireless signals are often broadcast to an area in which the intended communication partner, as well as other observers of the wireless signals may be present. It is generally desirable for only the intended parties of the communication to be able to discern the information that is being conveyed. So, the information itself is often at least sometimes encrypted, where the keys to the decryption are generally only known to the sender and the intended recipient of the communication.

Some wireless communication devices will maintain multiple connections and/or communication channels with one or more communication targets. This may be the result of the presence and operation of one or more user applications within the device, that may each require the ability to transmit or receive information. In turn this can result in multiple bearers being created and maintained in a particular device, which each may require one or more forms of security in order to insure the privacy and/or integrity of the information being conveyed. In many wireless environments, a communication connection may be managed relative to a communication standard, which defines the details that must be agreed upon and understood to facilitate a more seamless connection. These agreed upon details will often include the details related to the security of the wireless communications. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In some instances, a wireless communication device may be currently connected to one or more communication targets using multiple different standards. Still further, some communication connections may involve multiple types of networks via which data related to the connection can be conveyed, where each network can have its own standard. In at least some instances, this may be referred to as dual connectivity. Even with some forms of dual connectivity, a particular communication connection may be focused more exclusively with a connection to a particular one of the multiple types of networks. In other instances, a communication connection may route information through multiple networks. In each of these and other instances an understanding as to how the security will be managed for each of the bearers can be important. Some systems may attempt to use the same manner of security for all communication bearers associated with a particular wireless communication device. Other systems may apply and manage a different form of security relative to each different communication bearer. Whichever manner is selected has the potential to impact different aspects of the communication connection differently, including if and when the security keys associated with a particular bearer might need to be refreshed.

The present inventors have recognized, that the security keys for a selected subset of existing radio bearers including less than all of the existing radio bearers can be caused to change as part of a connection reconfiguration message, which targets the selected subset.

SUMMARY

Presently, user equipment, such as wireless communication devices, communicate with other communication devices using wireless signals. According to a possible embodiment, a method in a user equipment having a communication connection including a plurality of radio bearers having security keys for use with a communication network is provided. The method includes receiving a connection reconfiguration message, which identifies bearer specific changes to be made to a subset of radio bearers including less than all of the plurality of radio bearers, that impact the security keys being used by the subset of radio bearers, where the connection reconfiguration message includes a bearer identification field that identifies the radio bearers included in the subset and a chaining counter. The method further includes applying the requested changes to the subset of radio bearers associated with the bearer identification field without resetting the communication connection with the communication network.

According to a possible embodiment, a user equipment having a communication connection including a plurality of radio bearers with a communication network is provided. The user equipment includes a transceiver that receives a connection reconfiguration message, which identifies bearer specific changes to be made to a subset of radio bearers including less than all of the plurality of radio bearers, that impact the security keys being used by the subset of radio bearers, where the connection reconfiguration message includes a bearer identification field that identifies the radio bearers included in the subset and a chaining counter. The user equipment further includes a controller that applies the requested changes to the subset of radio bearers associated with the bearer identification field without resetting the communication connection with the communication network.

According to a possible embodiment, a method in a network entity having a communication connection including a plurality of radio bearers having security keys for use with one or more user equipment is provided. The method includes generating a connection reconfiguration message, which identifies bearer specific changes to be made to a subset of radio bearers including less than all of the plurality of radio bearers, that impact the security keys being used by the subset of radio bearers, where the connection reconfiguration message includes a bearer identification field that identifies the radio bearers included in the subset and a chaining counter. The method further includes transmitting the connection reconfiguration message to the user equipment associated with the affected radio bearers. In some instances, the method can further include receiving an acknowledgement of completion of the requested changes to the subset of radio bearers associated with the bearer identification field without resetting the communication connection with the user equipment associated with the affected radio bearers.

According to a possible embodiment, a network entity having a communication connection including a plurality of radio bearers with one or more user equipment is provided. The user equipment includes a controller that generates a connection reconfiguration message, which identifies bearer specific changes to be made to a subset of radio bearers including less than all of the plurality of radio bearers, that impact the security keys being used by the subset of radio bearers, where the connection reconfiguration message includes a bearer identification field that identifies the radio bearers included in the subset and a chaining counter. The user equipment further includes a transceiver that transmits the connection reconfiguration message to the user equipment associated with the affected radio bearers.

These and other objects, features, and advantages of the present application are evident from the following description of one or more preferred embodiments, with reference to the accompanying drawings.

DETAILED DESCRIPTION OF THE PREFERRED EMBODIMENT(S)

Figure 1:
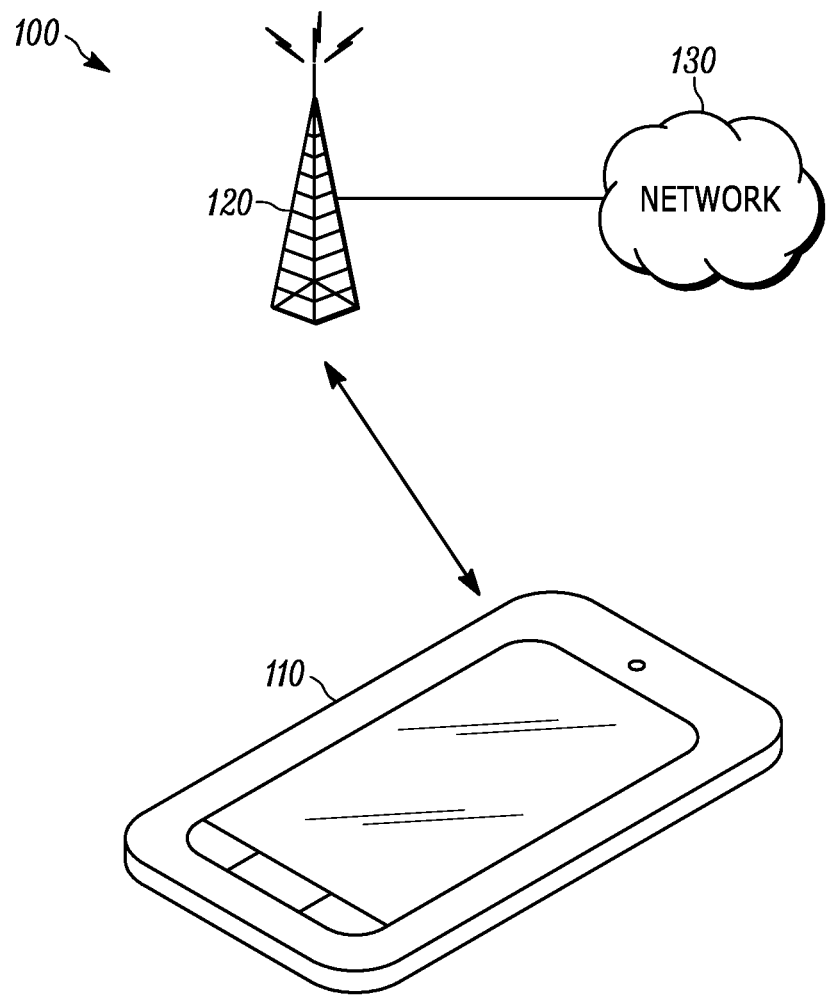
FIG. 1 is a block diagram of an exemplary network environment in which the present invention is adapted to operate

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for implementing bearer specific changes to a limited number of bearers.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

There are certain changes/reconfiguration that may be performed not for the whole User Equipment (UE) but to only a limited number (but not all) of its Bearers. This is true for single connectivity, as well as for Dual Connectivity situations. In Single Connectivity situations, if the UE has more than one bearer but only one of the Bearers is affected by a change that would "traditionally" need for the UE to flush the Hybrid Automatic Repeat Request (HARQ) Buffers, performing a Medium Access Control (MAC) Reset in such a situation may be overkill since it also could flush the HARQ buffers not containing any Radio Link Control (RLC) Protocol Data Units (PDUs) from the affected bearer; and in addition HARQ buffer flushing in general could also affect other bearers whose packets might be sharing the corresponding Transport Block with the packet(s) from the affected Bearer. In dual connectivity, for a change affecting only the Split Bearer for example could affect both a Master and a Secondary Node. Like in the Single Connectivity case, a MAC Reset (in Master and/or Secondary) side may be overkill, since the other Bearers can also be impacted.

At least the following three types of changes may potentially require MAC Reset which can affect "other" bearers, that may have had nothing to do with the change, namely
  1. Secondary Node Change;
  2. Bearer Type Change; and
  3. Packet Data Convergence Protocol (PDCP) COUNT wrap-around.

As for the impact on "other" bearers and to the whole UE, the following are cited as being possible, namely
  (a) increased latency since RLC re-transmission may need to take care of the flushed HARQ buffers;
  (b) data loss for Unacknowledged Mode (UM) bearers, since there may be no RLC re-transmissions for an Uplink (UL) bearer; and (c) Radio Link Failure (RLF) may happen when the maximum number of RLC retransmissions has been reached for a Master Cell Group (MCG), Secondary Cell Group (SCG) or split Data Radio Bearer (DRB) as a result of HARQ flushing leading to one more (and exceeding the maximum allowed) RLC re-transmissions.

In LTE, the Access Stratum (AS) applies three different security keys: one for the integrity protection of Radio Resource Control (RRC) signaling ($K_{RRCint}$), one for the ciphering of RRC signaling ($K_{RRCenc}$) and one for the ciphering of user data ($K_{UPenc}$). All three AS keys are derived from the $K_{eNB}$ key. The $K_{eNB}$ is based on the $K_{ASME}$ key, which is handled by upper layers.

Figure 2:
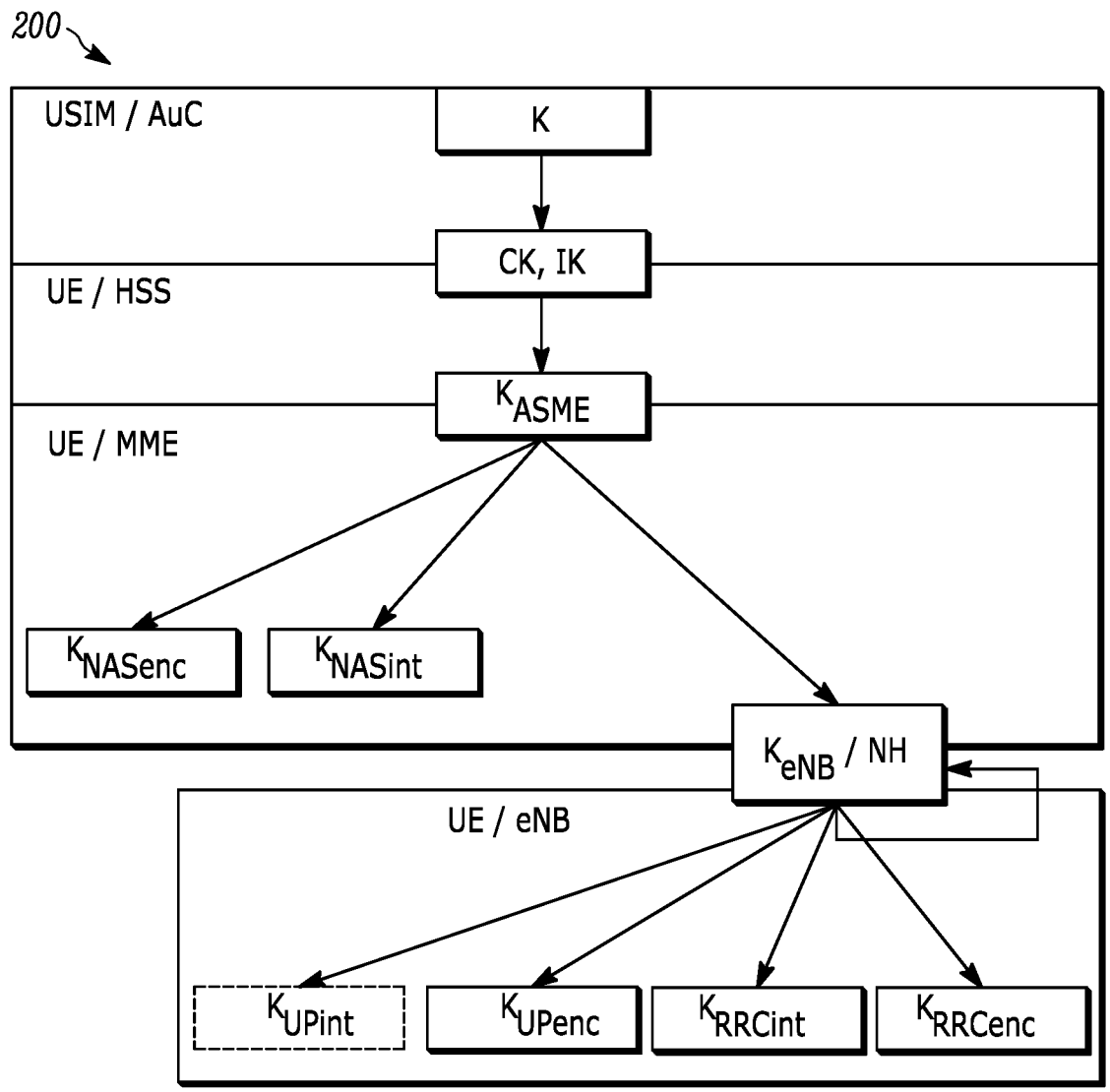
FIG. 2 is a block diagram of the key hierarchy in an exemplary system, such as a Long Term Evolution (LTE) system.
Figure 6:
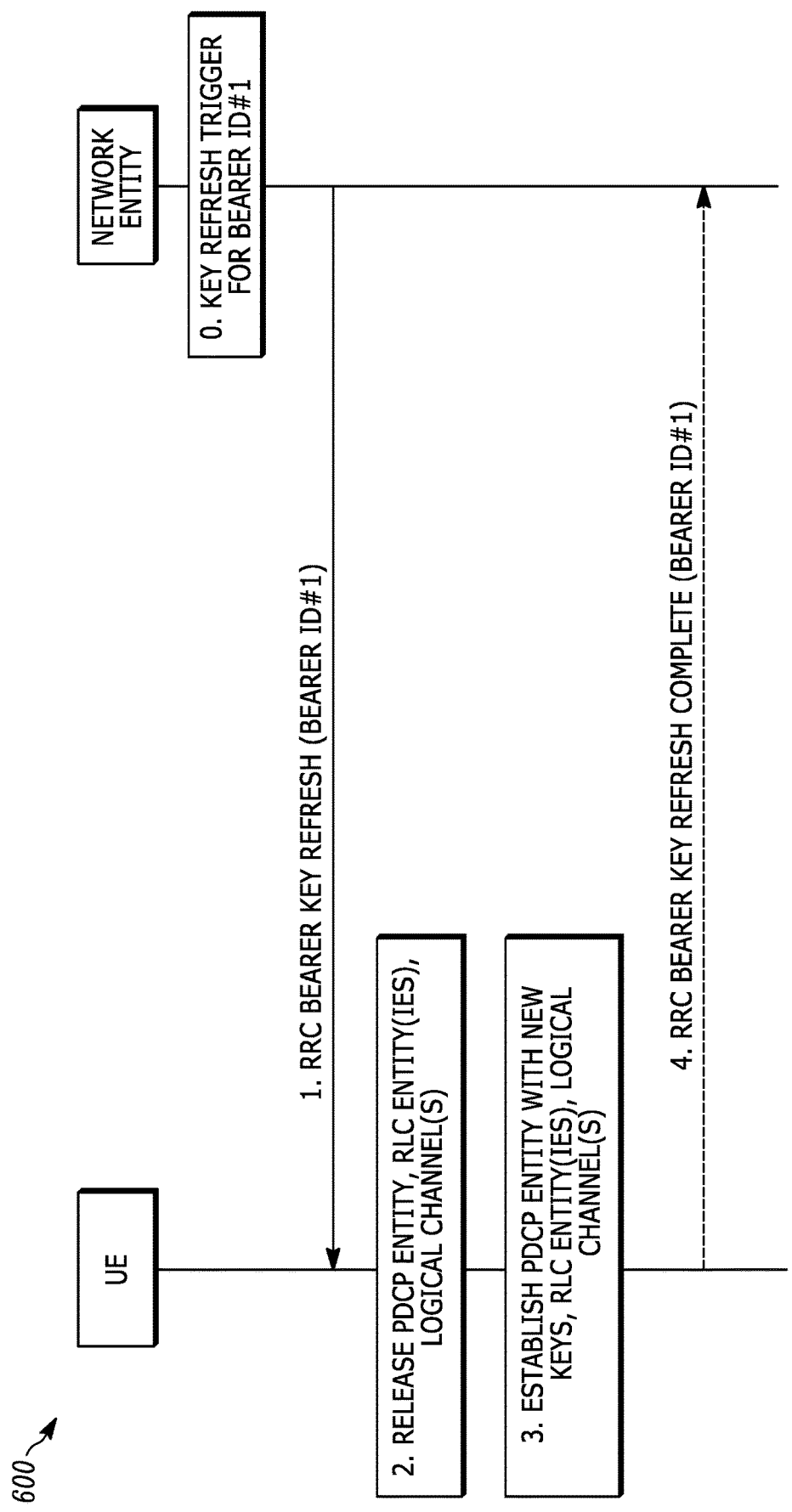
FIG. 6 is a message sequence diagram for changing the security key(s) for a radio bearer, in accordance with at least a further embodiment.

The key hierarchy for LTE is described in Third Generation Partnership Project (3GPP) Technical Specification (TS) 33.401, FIG. 6.2-1, which has been reproduced in the present application as FIG. 2. FIG. 2 illustrates a block diagram 200 of the key hierarchy in an exemplary system, such as a Long Term Evolution (LTE) system.

The integrity and ciphering algorithms can generally be changed upon handover. The four AS keys ($K_{eNB}$, $K_{RRCint}$, $K_{RRCenc}$ and $K_{UPenc}$) generally change upon every handover, connection re-establishment and connection resume. The keyChangeIndicator is used upon handover and indicates whether the UE should use the keys associated with the $K_{ASME}$ key taken into use with the latest successful Non Access Stratum (NAS) Security Mode Command (SMC) procedure. The nextHopChainingCount parameter is used upon handover, connection re-establishment and connection resume by the UE when deriving the new $K_{eNB}$ that is used to generate $K_{RRCint}$, $K_{RRCenc}$ and $K_{UPenc}$ (see 3GPP TS 33.401 3GPP, "System Architecture Evolution (SAE); Security architecture", v15.0.0, 14.06.2017). An intra cell handover procedure may be used to change the keys in RRC_CONNECTED.

For each radio bearer, an independent counter (COUNT, as specified in TS 36.323 [8]) is maintained for each direction. For each Data Radio Bearer (DRB), the COUNT is used as input for ciphering. For each Signaling Radio Bearer (SRB), the COUNT is used as input for both ciphering and integrity protection. It is generally not allowed to use the same COUNT value more than once for a given security key.

In case of Dual connectivity, a separate $K_{eNB}$ is used for SCG-DRBs (S-$K_{eNB}$). This key is derived from the key used for the MCG ($K_{eNB}$) and an SCG counter that is used to ensure freshness. To refresh the S-$K_{eNB}$, such as when the COUNT will wrap around, E-UTRAN employs an SCG change, i.e. an RRCConnectionReconfiguration message including mobilityControlInfoSCG. When performing handover, while at least one SCG-DRB remains configured, both $K_{eNB}$ and S-$K_{eNB}$ are refreshed. In such a case, the Evolved Universal Mobile Telecommunications System Terrestrial Radio Access Network (E-UTRAN) performs a handover with an SCG change, such as for an RRCConnectionReconfiguration message including both mobilityControlInfo and mobilityControlInfoSCG. The ciphering algorithm is common for all radio bearers within a Cell Group (CG) but may be different between MCG and SCG. The ciphering algorithm for SCG DRBs can generally only be changed upon SCG change.

As mentioned above, in LTE a wrap-around of the COUNT for one radio bearer will affect all radio bearers of the eNB, since $K_{eNB}$/S $K_{eNB}$ needs to be refreshed, i.e. security algorithm for all radio bearers of the cell group are refreshed. However for NR, the aim is to allow the change of security key(s) for one radio bearer, such as due to wrap around of COUNT, without affecting the other radio bearers. The present disclosure outlines several methods for the security key change procedure of a radio bearer. In particular, several embodiments on the layer 2 handling at security key refresh/change are disclosed.

In the following, the term eNB/gNB is used for the base station but it is replaceable by any other radio access node, e.g. Base Station (BS), eNB, gNB, Access Point (AP), NR etc. Further, the proposed method is applicable also to other types of networks including 5th generation new radio access technology (NR), IEEE 802.11 variants, GSM, General Packet Radio Service (GPRS), Universal Mobile Telecommunications System (UMTS), LTE variants, Code Division Multiple Access (CDMA) 2000, Bluetooth, ZigBee, Sigfoxx, etc.

Figure 3:
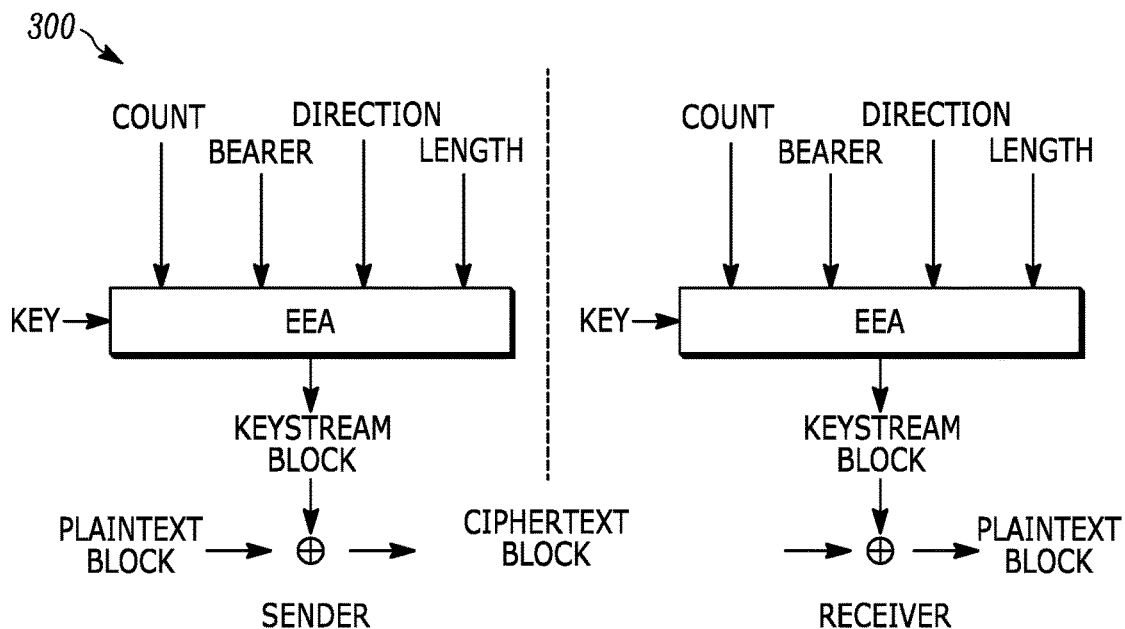
FIG. 3 is a block diagram for the ciphering of data, where a count value is an input of the ciphering.
Figure 4A:
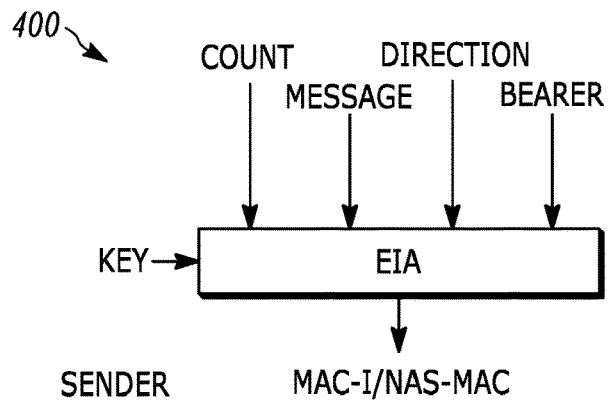
FIGS. 4A and 4B are block diagrams for the derivation of integrity protection signaling involving a count value is an input of the derivation, where FIG. 4A highlights the derivation for a sender, and FIG. 4B highlights the derivation for a receiver.
Figure 4B:
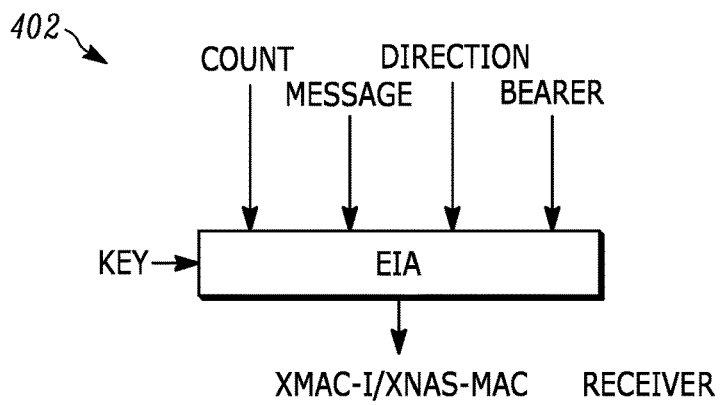

According to a possible embodiment, there are occasion such as but not limited to COUNT wrap-around where it may be desirable for the keys for ciphering and integrity protection of a Bearer to be changed. The "COUNT" is an input in the actual ciphering and integrity protection as shown in both FIG. 3, and FIGS. 4A and 4B. More specifically, FIG. 3 illustrates a block diagram 300 for the ciphering of data, where a count value is an input of the ciphering. FIGS. 4A and 4B illustrate block diagrams 400 and 402 for the derivation of integrity protection signaling involving a count value that is an input of the derivation, where FIG. 4A highlights the derivation for a sender, and FIG. 4B highlights the derivation for a receiver.

For each radio bearer, an independent counter (COUNT, as specified in 3GPP TS 36.323-e10) is maintained for each direction. In LTE for each DRB, the COUNT is used as input for ciphering. For each SRB, the COUNT is used as input for both ciphering and integrity protection. It is not allowed to use the same COUNT value more than once for a given security key with same other input parameters like Bearer ID, DIRECTION etc.

There may be various reasons why a certain bearer should change the current keys, while it would not be desirable to refresh the keys of the other bearers, for example a potential trigger could be a packet count for the bearer that is exceeded, a time count for the bearer that is exceeded, and/or different policies from higher layers that require more frequent or less frequent key changes depending on the application service.

According to one embodiment, the security key(s) of a radio bearer is changed by first releasing the radio bearer for which the security key(s) have to be changed and subsequently adding a new radio bearer. A Network entity (NE) such as a base station, eNB, gNB or the like, signals a bearer release message to the UE, ordering the UE to release the radio bearer identified by the radio bearer identity included in the release/reconfiguration message. The UE upon reception of the release message will according to certain embodiments release the PDCP entity, the Radio Link Control (RLC) entity or entities, the logical channel(s) of the radio bearer indicated by the radio bearer identity. The network entity (NE) also signals a radio bearer addition message to the UE, using Radio Resource Control (RRC) signaling. In response to receiving the radio bearer addition message from the NE, the UE establishes a PDCP entity and configures it with new security keys and in accordance with the received PDCP-Configuration contained in the radio bearer addition message. Furthermore, the UE establishes an RLC entity or entities in accordance with the received RLC-Configuration signaled in the radio bearer addition message. UE establishes a logical channel in accordance with the received logicalChannelIdentity and the received logicalChannelConfiguration signaled within the radio bearer addition message. According to one embodiment, the logical channel identity of the newly established logical channel is different from the logical channel identity of the radio bearer being released.

Figure 5:
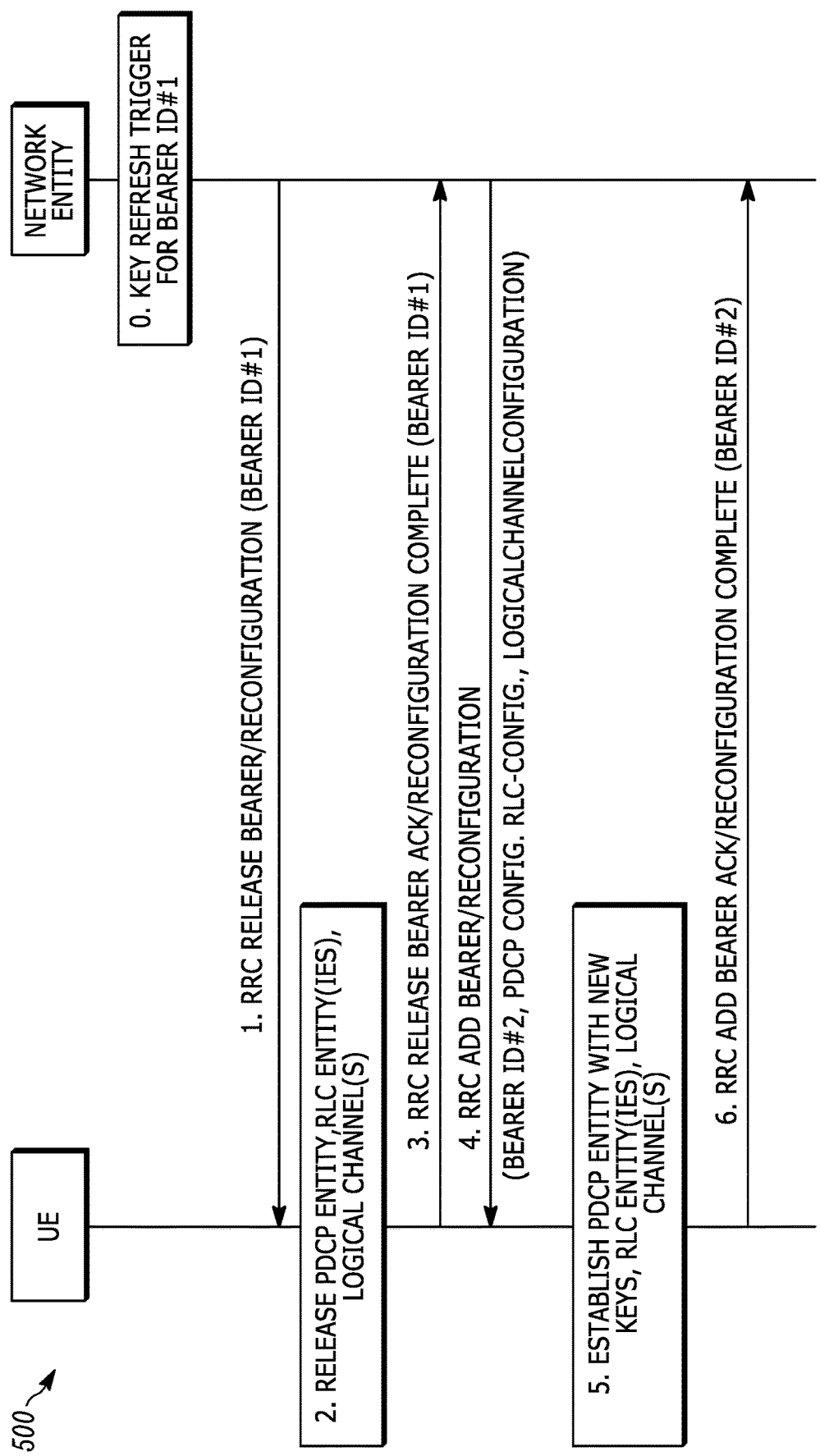
FIG. 5 is a message sequence diagram for changing the security key(s) for a radio bearer, in accordance with at least one embodiment.

FIG. 5 illustrates a message sequence diagram 500 for changing the security key(s) for a radio bearer, in accordance with at least one embodiment of the present application.

The Medium Access Control (MAC) is not reset in response to releasing the radio bearer and adding a new radio bearer. Since a new logical channel identity is used for the new radio bearer, the receiving MAC layer just discards the packets of the old radio bearer which are still subject to Hybrid Automatic Repeat Request (HARQ) retransmissions after a successful HARQ combining.

According to one embodiment, the radio bearer release and radio bearer addition is signaled in one message to the UE, i.e. one new RRC message, indicating specifically the key refresh of a particular bearer, and may add some security relevant parameters that would help the UE to derive the new keys. The UE may release, similar to the previous embodiment, the indicated bearer and add back a new bearer with the same configuration as the released bearer. The UE may acknowledge the RRC Bearer Key Refresh request. The following embodiments propose to send indications or parameters from the User Equipment (UE) to the Network Entity (NE), this RRC Bearer Key Refresh Complete message may be used to carry the information.

FIG. 6 illustrates a message sequence diagram 600 for changing the security key(s) for a radio bearer, in accordance with at least a further embodiment of the present application.

According to one embodiment, the UE first adds a new radio bearer before releasing the radio bearer for which security key(s) are to be changed. This will help to implicitly ensure that the bearer identity and the logical channel identity are different for the newly established radio bearer and the released radio bearer.

According to another embodiment, the UE moves PDCP SDU from the old to be deleted radio bearer to the PDCP entity of newly added radio bearer. The PDCP entity of the radio bearer which will be deleted deciphers already processed PDCP PDUs which were not yet acknowledged and transfers them to the new PDCP entity in ascending order of the associated count value, which treats them as new arrived data.

The configuration of the PDCP/RLC entity of the added radio bearer may according to another embodiment be the same as the corresponding configuration of the released radio bearer except for the security configuration. According to another embodiment, the radio bearer identity and/or logicalChannelIdentity of the added radio bearer may be different to the identities of the released radio bearer.

According to another embodiment, the NE signals a message to the UE indicating the change of the security key(s) for a radio bearer identified by a radio bearer identity. In response to receiving the message, the UE will perform a PDCP reconfiguration with new security configuration/keys. Based on the new security configuration, the UE will derive new security key(s). According to certain embodiments, the UE will perform a PDCP re-establishment. In the PDCP transmitter, the PDCP SDUs/PDUs stored in the transmission buffer are processed again after re-establishment with the new security key(s). From the first PDCP SDU for which the successful delivery of the corresponding PDCP PDU has not been confirmed by lower layers, the UE performs a retransmission or transmission of all the subsequent PDCP SDUs in ascending order. According to one embodiment, PDCP PDUs which were already processed and associated with a Sequence Number (SN) prior to the re-establishment are deciphered (with the old key) and ciphered again with the new security key. The UE will further perform a reset respectively and a re-establishment of the RLC entity of the indicated radio bearer. The UE will for example for Radio Link Control (RLC) Acknowledged Mode (AM) discard the remaining AMD PDUs in the receiving side and discard all RLC SDUs and AMD PDUs respectively all RLC control PDUs in the transmitting side. For NR the UE in response to receiving an RLC re-establishment indication will discard the data in the RLC layer and reset the state variables. Further details about the RLC re-establishment procedure can be found e.g. in TS38.322.

According to further embodiments, the UE will in response to the receiving the message flush the HARQ buffer and perform a MAC reset. The reason for the reset is to clear off MAC PDU, which are using the old security key configuration.

However, a MAC reset will typically cause disruption to not just the bearer of concern with key change but also other bearers and SRB as well which are not affected by the key change. Therefore according to another embodiment, the UE will only flush those HARQ transmission buffers, which contain data of the radio bearer for which a change of the security key(s) is indicated in the signaling message and not perform a MAC reset. According to another embodiment, UE indicates to the NE, the process IDs of the flushed HARQ Tx buffer(s). NE may not schedule any further retransmissions for that HARQ processes but rather schedule new initial transmissions. The HARQ process ID indication may be signaled in the response to the RRC message which orders the UE to change the security key(s) of a radio bearer, e.g. RRC connection reconfiguration complete message. According to another embodiment, UE sends a new Transport Block (TB) (initial transmission) in response to receiving a retransmission grant for a HARQ process that was flushed due to security key change procedure.

According to another embodiment, the UE will not perform a MAC reset in response to changing the security key(s) of a radio bearer. PDCP transmitter may inform the PDCP receiver of the COUNT value respectively sequence number of the first PDCP SDU ciphered with the new security key after re-establishment. This information is according to certain embodiments sent in a MAC control element or PDCP control element to the receiving side. Alternatively, the COUNT information is sent in the RRC response message to the RRC message ordering the security key change, such as an RRC connection reconfiguration complete message/RRC key refresh complete message.

Figure 7:
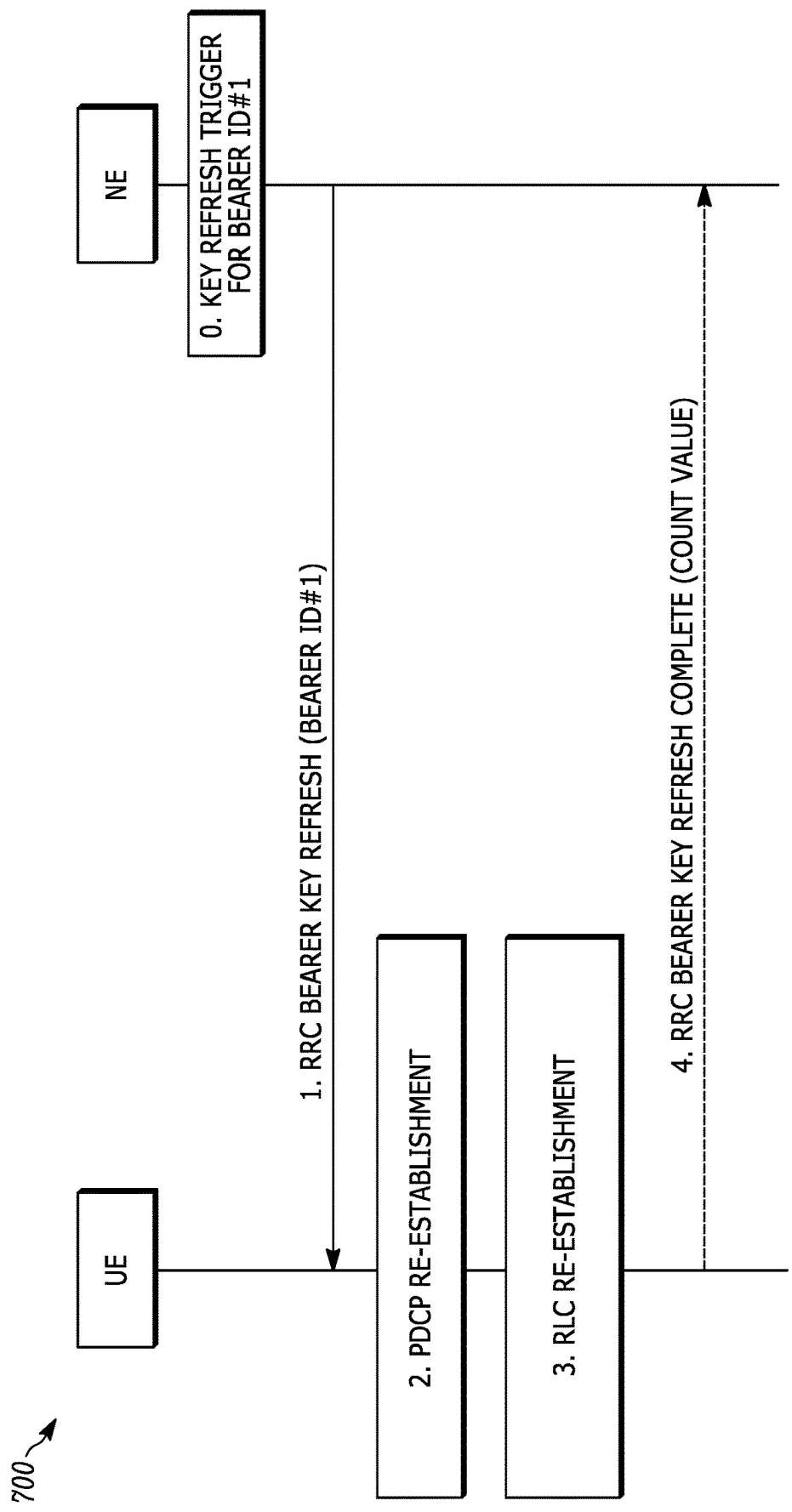
FIG. 7 is a message sequence diagram for changing the security key(s) for a radio bearer, in accordance with at least a still further embodiment.

FIG. 7 illustrates a message sequence diagram 700 for changing the security key(s) for a radio bearer, in accordance with at least a still further embodiment of the present application.

According to other embodiments, the UE will trigger a buffer status report in response to changing the security key(s) of a radio bearer. In particular for the case that the security key(s) of a radio bearer are changed by releasing the radio bearer and adding a new radio bearer, a packet loss may occur, i.e., data stored in the (re)transmission buffer in the PDCP/RLC layer are flushed. In consequence, the buffer status of the UE is changing. Therefore, it would be beneficial to inform the NE about the changed buffer status in order to allow for efficient future scheduling.

According to yet another embodiment, the UE will in response to receiving an indication to change the security key(s) of a radio bearer cancel scheduling request(s) and/or buffer status report(s) triggered due to data becoming available for transmission for the logical channel associated to the radio bearer for which security key(s) are to be changed.

According to one embodiment, the UE will trigger a PDCP status report in response to changing the security key(s) of a radio bearer. The status report contains information on the successful received PDCP SDUs prior to the security key(s) change.

According to another embodiment, the UE will in response to receiving an order from network to perform a security key change/refresh for a radio bearer perform an intra-cell handover procedure for that indicated radio bearer without applying a MAC reset.

The multiple embodiments above disclose methods for the user plane/layer 2 behavior performed at security key change for one particular radio bearer. In case of handover, this procedure could be applied for all configured radio bearers which are to be handed over. Furthermore, the procedures outlined in the several embodiments can be also applied for a set of radio bearers, e.g., all configured split bearers, all radio bearers belonging to one cell group.

According to a possible embodiment, the following can take into account at least some of the above noted concerns. More specifically, the following 3 types of changes may potentially require MAC Reset which can affect "other" bearers (that had nothing to do with the said change); leading to increases in latency (when RLC re-transmission will take care of the flushed HARQ buffers), data loss (UM bearers) or even to RLF (maximum number of RLC retransmissions has been reached for an MCG or split DRB). The 3 types of changes include:
1. Secondary Node Changes: If there is a SCG Split DRB, then the question is does the MCG MAC need to be necessarily reset if there are other bearers (MCG Bearers)? The problem is explained in FIG. 8, where MCG leg of the SCG Split bearer ends up in the same MAC as for a MCG Bearer. So, an MCG MAC Reset to flush HARQ buffer for the "MCG leg of the SCG Split bearer" will also affect the MCG Bearer, which could be avoided.

Figure 8:
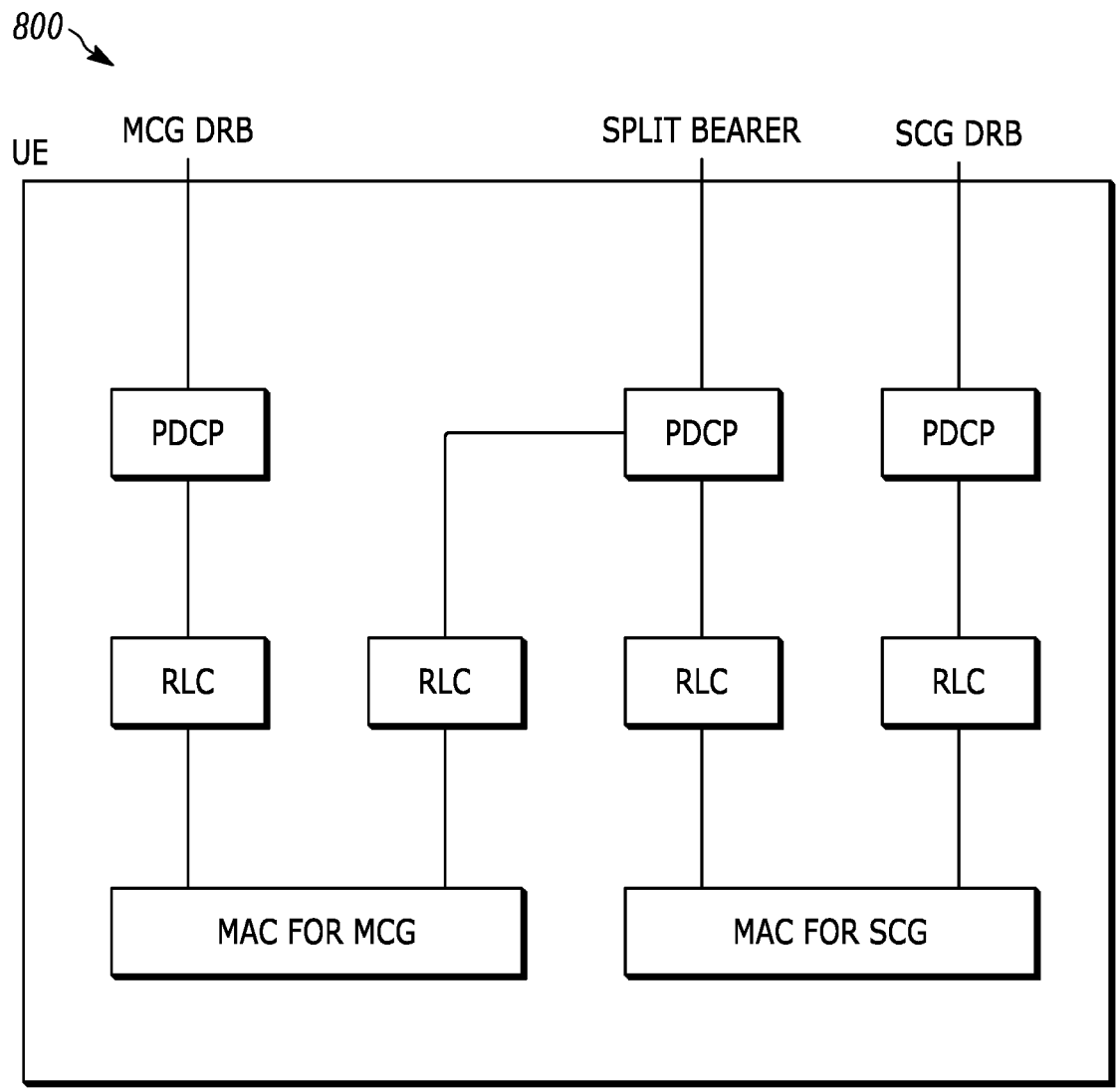
FIG. 8 is a block diagram of an exemplary arrangement of radio bearers for multiple types of radio bearers relative to the Medium Access Control (MAC) entity associated with each one of a Master Cell Group and a Secondary Cell Group, where the master cell group data radio bearer and the master cell group leg of the split data radio bearer are in the same Medium Access Control (MAC) entity.

More specifically, FIG. 8 illustrates a block diagram 800 of an exemplary arrangement of radio bearers for multiple types of radio bearers relative to the Medium Access Control (MAC) entity associated with each one of a Master Cell Group and a Secondary Cell Group, where the master cell group data radio bearer and the master cell group leg of the split data radio bearer are in the same MAC entity.
2. Bearer Type Changes: Of concern are the cases with a PDCP anchor point change (from the network point of view) and at least one 'old' leg remains. This 'old leg' will have packets protected with the old key and after the key-change the receiver will receive packets protected with old key and packets protected with new key. Some time at the receiver these packets arrive intermingled making it hard for the receiver to decipher/verify the packets. Here, the following six items emerge:
   1. MCG Split to SCG Split Bearer
   2. SCG Split to MCG Split Bearer
   3. MCG to SCG Split Bearer
   4. SCG Split to MCG Bearer
   5. SCG to MCG Split Bearer
   6. MCG Split to SCG Bearer In addition, if Security and Privacy in 3GPP Systems working group (SA3) decides to have keys per Bearer type, then two more items may be added:
   7. MCG to MCG Split Bearer
   8. SCG to SCG Split Bearer The question is then what happens on the 'old' leg, which is protected with the old key? Is the corresponding MAC Reset, so as to avoid delivering packets with the old key?
3. Per Bearer or Per Bearer Type Key changes: When the COUNT value for a bearer is about to wrap-around, an Intra-cell Handover (HO) is performed in LTE to avoid the impending security threat, namely the reuse of the security input parameters like Bearer-id, DIRECTION, COUNT and the Security-Key in ciphering/integrity protecting of the plain text. Since COUNT wrap-around can be a rare case, a "heavy" (i.e. handover) solution was acceptable in LTE. However, if a solution for the above problem(s) is designed then it's good to check if the solution can possibly also solve this issue.

Figure 9:
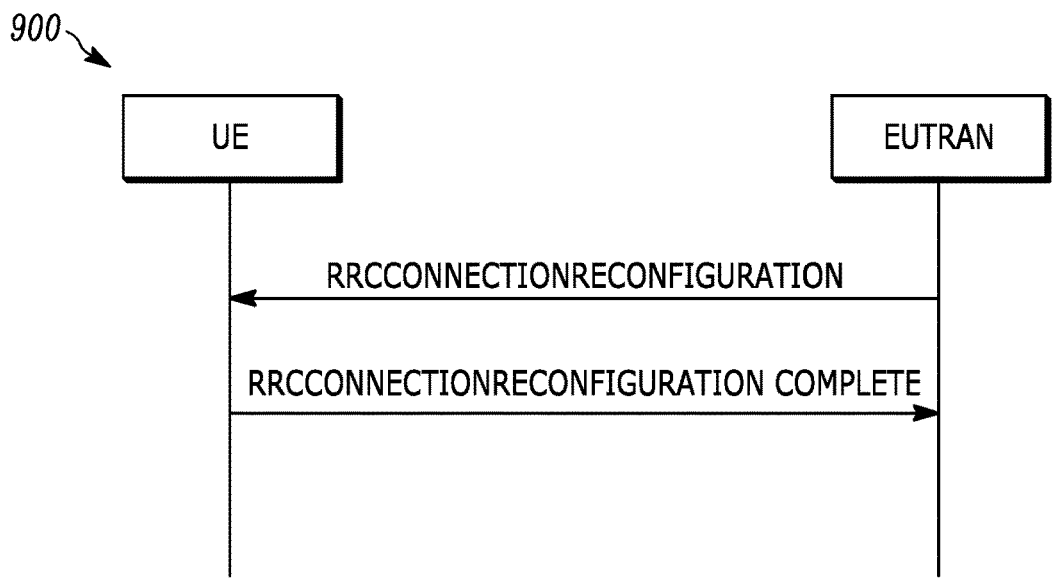
FIG. 9 is a message sequence diagram for implementing bearer specific changes to a selected subset of bearers.

All the three changes, namely a Secondary Node Change, a Bearer Type Change and a Key Change, can be carried by an Radio Resource Control (RRC) Procedure. In 3GPP TS 36331-e30, these can be carried out using an RRC Connection Reconfiguration procedure. FIG. 9 illustrates a message sequence diagram 900 for implementing bearer specific changes to a selected subset of bearers.

A change of Secondary Node is initiated by the NE using RRCConnectionReconfiguration including the mobilityControlInfo. On the other hand, a bearer type change per se does not need to include mobilityControlInfo; however, in 5G NR (New RAT) technology, there might be distinct security key(s) per Bearer or per Bearer Type and therefore when performing a Bearer Type Change mobilityControlInfo needs to be included to take care of the security key change for this bearer. Finally, the PDCP COUNT wrap-around, here as well the mobilityControlInfo would be helpful to be included to take care of the security key change. So, the disclosure in one embodiment uses RRC-ConnectionReconfiguration including the mobilityControlInfo for carrying out the 3 types of changes mentioned before. On this ground, two further possible embodiments are also disclosed.

Embodiment 1

In this embodiment the PDCP and RLC entities of the affected Bearer(s), for example all bearers originating/terminating in the secondary node for secondary node changes; bearer(s) whose bearer-type is being changed; and bearer for which PDCP COUNT is about to wrap-around, can be re-established in the UE upon reception of the said RRC-ConnectionReconfiguration message. The re-establishment would result in the flushing of RLC transmission and re-transmission buffers and PDCP would from the first PDCP SDU for which the successful delivery of the corresponding PDCP PDU has not been confirmed by lower layers, perform retransmission or transmission of all the PDCP SDUs already associated with PDCP SNs in ascending order of the COUNT values associated to the PDCP SDU prior to the PDCP re-establishment, and the PDCP would perform security (ciphering and/or integrity protection) of the PDCP SDU using the COUNT value associated with this PDCP SDU using the new derived security key(s). The RRCConnectionReconfiguration message could additionally contain the following fields: drb-Identity, logicalChannelIdentity (or logicalChannelIdientitySCG), and optionally drb-TypeChange/drb-Type is included for Bearer Type change. The UE first of all determines if the signaled drb-identity already exists, then applies the new keys for the affected bearer identified with drb-identity, retains PDCP and RLC configuration from the existing bearer for this drb-identity except for parts/IEs included in the RRCConnectionReconfiguration message, and replaces the old logicalChannelIdentity with the included new logicalChannelIdentity. The transmissions from this bearer are made using the new key on the new logical channel identity. MAC protocol is not Reset and the receiver side MAC will therefore fail to deliver the RLC PDUs to the "old" RLC entity (corresponding to "old" logicalChannelIdentity) and thereby discard these RLC PDUs. As a result, the MAC does not need to be reset and also the receiving side is not required to handle two security keys at any point of time for the same (affected) bearer. Further, since no HARQ buffer flushing takes place, none of the problem mentioned earlier would take place.

Embodiment 2

In this embodiment, neither the PDCP nor the RLC entity of the affected Bearer(s), such as all bearers originating/terminating in the secondary node for secondary node changes, bearer(s) whose bearer-type is being changed, and bearer(s) for which PDCP COUNT is about to wrap-around, is re-established in the UE upon reception of the said RRCConnectionReconfiguration message. Therefore there is no flushing of RLC transmission and re-transmission buffers and PDCP need not perform retransmission or transmission of any the PDCP SDUs already associated with PDCP SNs. The transmitter PDCP shall first of all ascertain the PDCP COUNT value for a PDCP SDU not yet assigned a sequence number. The RRC/PDCP shall configure the new key to be used (based on the mobilityControlInfo or mobilityControlInfoSCG included in RRCConnectionReconfiguration message) and signal the ascertained COUNT value to the receiver side in the RRC Reconfiguration Complete message. The receiver (e.g. gNB) shall continue to use (e.g. to decipher the PDCP PDUs) the old key for PDCP PDUs with COUNT values smaller than the signaled COUNT and new key for PDCP PDUs with COUNT values higher than (or equal to) the signaled COUNT. This embodiment has the benefit that no data loss/o delay happen due to RLC re-transmissions making up for the losses due to HARQ buffer flushing. Also, since no HARQ buffer flushing takes place, none of the problem mentioned earlier take place. One further advantage is that the data Pre-processing in layer 2 is not wasted. Data Pre-processing in layer 2 is done to speed up data transmission in the system, such as a New Radio (NR) system. As for one disadvantage, COUNT number monitoring and applying the corresponding key in the receiver side may require the receiver to maintain two keys at least for some transient time. In this solution embodiment as well, the UE first of all determines if the signaled drb-identity already exists, then applies the new keys for the affected bearer identified with the drb-identity, and retains PDCP and RLC configuration from the existing bearer for this drb-identity except for parts/IEs included in the RRCConnectionReconfiguration message, if any. The transmissions from this bearer are made using the new key from the ascertained COUNT value (for a PDCP SDU not yet assigned a sequence number).

Figure 10:
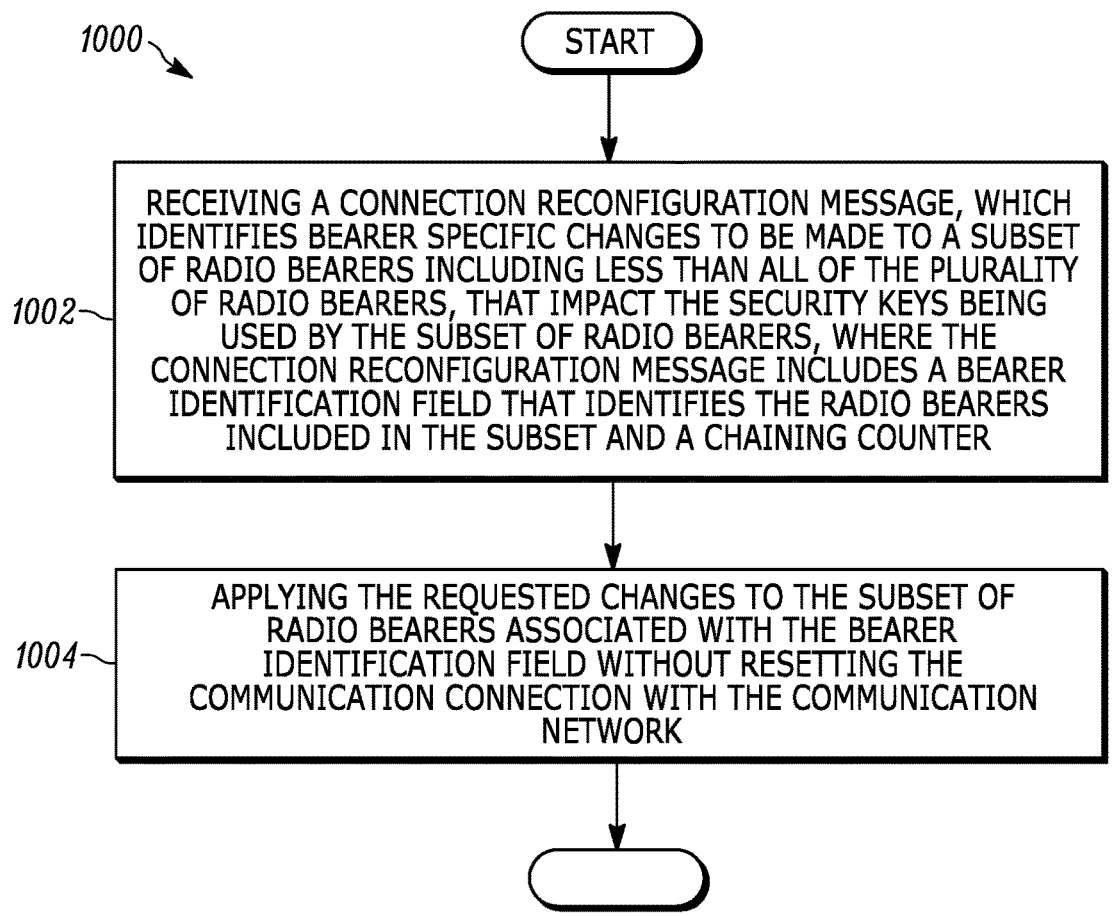
FIG. 10 is a flow diagram of a method in a user equipment for implementing bearer specific changes to a selected subset of bearers.

FIG. 10 illustrates a flow diagram 1000 of a method in a user equipment for implementing bearer specific changes to a selected subset of bearers. The method includes receiving 1002 a connection reconfiguration message, which identifies bearer specific changes to be made to a subset of radio bearers including less than all of the plurality of radio bearers, that impact the security keys being used by the subset of radio bearers, where the connection reconfiguration message includes a bearer identification field that identifies the radio bearers included in the subset and a chaining counter. The method further includes applying 1004 the requested changes to the subset of radio bearers associated with the bearer identification field without resetting the communication connection with the communication network.

In some instances, the method can further include one or more buffers associated with the communication connection, wherein each of the one or more buffers are associated with at least some of the plurality of radio bearers, and wherein when applying the requested changes to the subset of radio bearers, at least some of the contents of at least some of the buffers associated with the subset of radio bearers for which a reconfiguration has been requested are maintained.

In some instances, as part of applying the requested changes to the subset of radio bearers, a radio link control entity can be re-established, which can include the flushing of radio link control transmission and retransmission buffers.

In some instance, as part of applying the requested changes to the subset of radio bearers, a packet data convergence protocol entity can be re-established with a new set of derived keys. In some of these instances, prior to re-establishment of the packet data convergence protocol entity, the packet data convergence protocol entity may perform retransmission and transmission of service data units already associated with a sequence number in ascending order using an earlier set of keys. In some of these or other instances, after re-establishment of the packet data convergence protocol entity, the packet data convergence protocol entity may perform security of the service data units using the new set of derived keys.

In some instances, the connection reconfiguration message can include a new logical channel identity, which may be used for an identified radio bearer to replace a prior logical channel identity. In some of these instances, after the new logical channel identity is associated for use with the identified radio bearer, packets of data received for the replaced prior logical channel identity may not be delivered, and may be discarded by a receiving Medium Access Control (MAC) entity.

In some instances, as part of applying the requested changes to the subset of radio bearers, a radio link control entity may be maintained.

In some instances, as part of applying the requested changes to the subset of radio bearers, a packet data convergence protocol entity may be maintained.

In some instances, as part of applying the requested changes to the subset of radio bearers, a new set of security keys may be derived.

In some instances, a count value or sequence number of a first packet (PDCP PDU) is determined by the transmitting PDCP entity and then this count value or sequence number is signaled to the receiving PDCP entity either in the reconfiguration complete message or using a separate PDCP Control PDU. In some of these instances, packet data units for a particular radio bearer having an assigned count value, which is less than the determined value of the count included as part of either the connection reconfiguration complete message, or as part of received PDCP Control PDU, for the particular radio bearer will use an earlier set of security keys, and wherein packet data units for a particular radio bearer having an assigned count value, which is greater than or equal to the determined value of the count included as part of either the connection reconfiguration complete message, or as part of received PDCP Control PDU for the particular radio bearer will use a new set of security keys, which were derived as part of applying the requested changes to the subset of radio bearers. In some of these or other instances, as part of applying the requested changes to the subset of radio bearers, buffers related to a hybrid automatic repeat request for radio bearers for which a change of security keys have been requested will not be flushed.

In some instances, the connection reconfiguration message can be at least one of (a) received as part of a secondary node change, (b) received as part of a bearer type change, or (c) received in response to a detected count wrap around.

Figure 11:
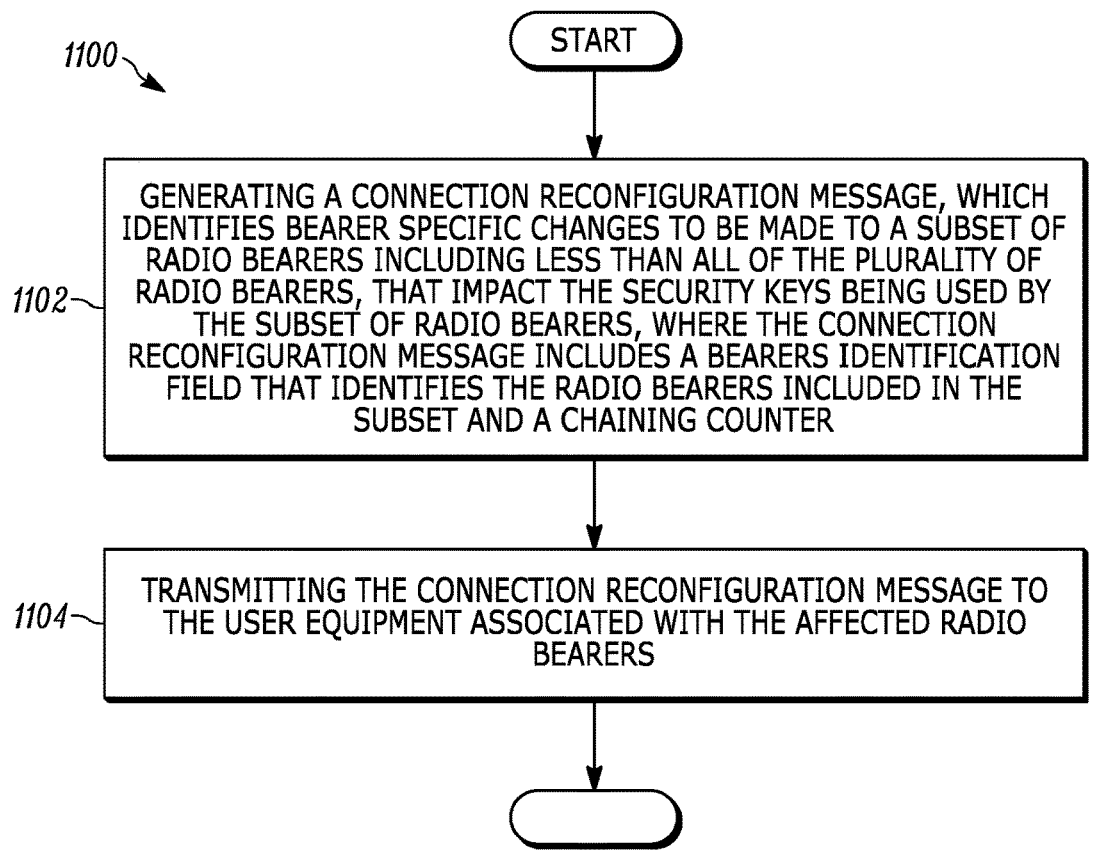
FIG. 11 is a flow diagram of a method in a network entity for implementing bearer specific changes to a selected subset of bearers.

FIG. 11 illustrates a flow diagram 1100 of a method in a network entity for implementing bearer specific changes to a selected subset of bearers. The method includes generating 1102 a connection reconfiguration message, which identifies bearer specific changes to be made to a subset of radio bearers including less than all of the plurality of radio bearers, that impact the security keys being used by the subset of radio bearers, where the connection reconfiguration message includes a bearer identification field that identifies the radio bearers included in the subset. The method further includes transmitting 1104 the connection reconfiguration message to the user equipment associated with the affected radio bearers. In some instances, the method can further include receiving an acknowledgement of completion of the requested changes to the subset of radio bearers associated with the bearer identification field without resetting the communication connection with the user equipment associated with the affected radio bearers.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 12:
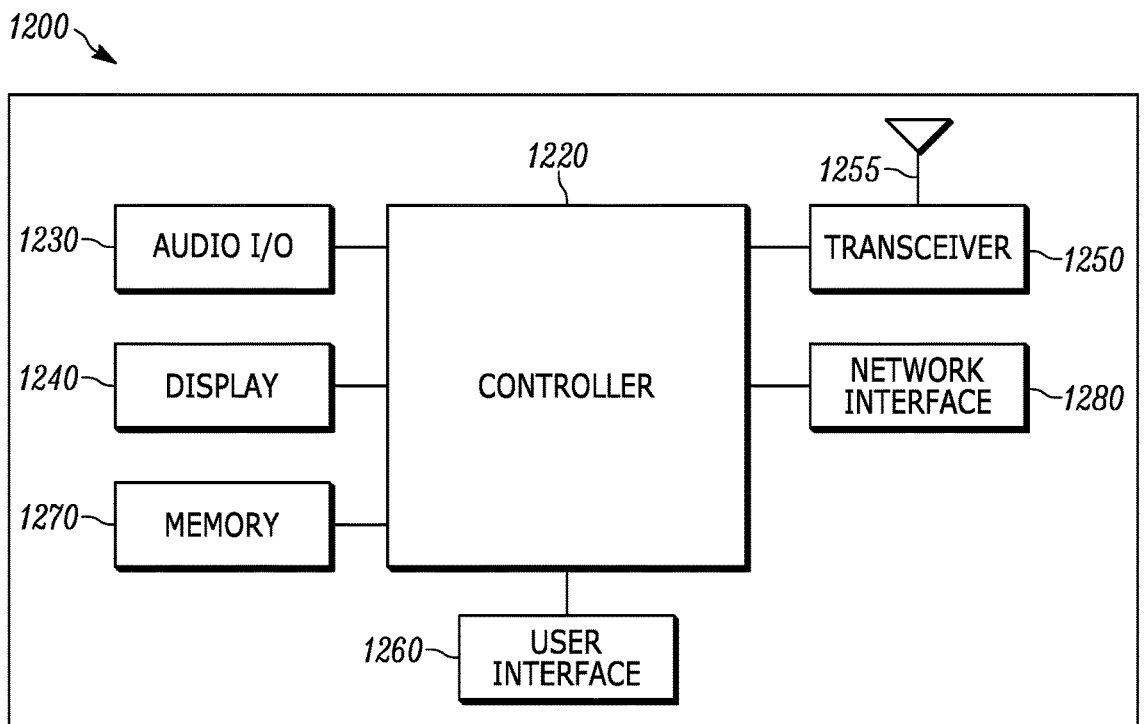
FIG. 12 is an example block diagram of an apparatus according to a possible embodiment.

FIG. 12 is an example block diagram of an apparatus 1200, such as the wireless communication device 110, according to a possible embodiment. The apparatus 1200 can include a housing 1210, a controller 1220 within the housing 1210, audio input and output circuitry 1230 coupled to the controller 1220, a display 1240 coupled to the controller 1220, a transceiver 1250 coupled to the controller 1220, an antenna 1255 coupled to the transceiver 1250, a user interface 1260 coupled to the controller 1220, a memory 1270 coupled to the controller 1220, and a network interface 1280 coupled to the controller 1220. The apparatus 1200 can perform the methods described in all the embodiments The display 1240 can be a viewfinder, a liquid crystal display (LCD), a light emitting diode (LED) display, a plasma display, a projection display, a touch screen, or any other device that displays information. The transceiver 1250 can include a transmitter and/or a receiver. The audio input and output circuitry 1230 can include a microphone, a speaker, a transducer, or any other audio input and output circuitry. The user interface 1260 can include a keypad, a keyboard, buttons, a touch pad, a joystick, a touch screen display, another additional display, or any other device useful for providing an interface between a user and an electronic device. The network interface 1280 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 1270 can include a random access memory, a read only memory, an optical memory, a solid state memory, a flash memory, a removable memory, a hard drive, a cache, or any other memory that can be coupled to an apparatus.

The apparatus 1200 or the controller 1220 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1270 or elsewhere on the apparatus 1200. The apparatus 1200 or the controller 1220 may also use hardware to implement disclosed operations. For example, the controller 1220 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1220 may be any controller or processor device or devices capable of operating an apparatus and implementing the disclosed embodiments. Some or all of the additional elements of the apparatus 1200 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,'" "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a user equipment having a communication connection including a plurality of radio bearers having security keys for use with a communication network, the method comprising:
   receiving a connection reconfiguration message, which identifies bearer specific changes to be made to a subset of radio bearers including less than all of the plurality of radio bearers, that impact the security keys being used by the subset of radio bearers, where the connection reconfiguration message includes a bearer identification field that identifies the radio bearers included in the subset and a chaining counter; and
   applying the requested changes to the subset of radio bearers associated with the bearer identification field without resetting the communication connection with the communication network.

2. A method in accordance with claim 1, further comprising one or more buffers associated with the communication connection, wherein each of the one or more buffers are associated with at least some of the plurality of radio bearers, and wherein when applying the requested changes to the subset of radio bearers, at least some of the contents of at least some of the buffers associated with the subset of radio bearers for which a reconfiguration has been requested are maintained.

3. A method in accordance with claim 1, wherein as part of applying the requested changes to the subset of radio bearers, a radio link control entity is re-established, which includes flushing of radio link control transmission and retransmission buffers.

4. A method in accordance with claim 1, wherein as part of applying the requested changes to the subset of radio bearers, a packet data convergence protocol entity is re-established with a new set of derived keys.

5. A method in accordance with claim 4, wherein prior to re-establishment of the packet data convergence protocol entity, the packet data convergence protocol entity will perform retransmission and transmission of service data units already associated with a sequence number in ascending order using an earlier set of keys.

6. A method in accordance with claim 4, wherein after re-establishment of the packet data convergence protocol entity, the packet data convergence protocol entity will perform security of the service data units using the new set of derived keys.

7. A method in accordance with claim 1, wherein the connection reconfiguration message includes a new logical channel identity, which will be used for an identified radio bearer to replace a prior logical channel identity.

8. A method in accordance with claim 7, wherein after the new logical channel identity is associated for use with the identified radio bearer, packets of data received for the replaced prior logical channel identity will not be delivered, and will be discarded by a receiving Medium Access Control entity.

9. A method in accordance with claim 1, wherein as part of applying the requested changes to the subset of radio bearers, a radio link control entity is maintained.

10. A method in accordance with claim 1, wherein as part of applying the requested changes to the subset of radio bearers, a packet data convergence protocol entity is maintained.

11. A method in accordance with claim 1, wherein as part of applying the requested changes to the subset of radio bearers, a new set of security keys will be derived.

12. A method in accordance with claim 1, wherein a count value or sequence number of a first packet (PDCP PDU) is determined by the transmitting PDCP entity and then this count value or sequence number is signaled to the receiving PDCP entity either in the reconfiguration complete message or using a separate PDCP Control PDU.

13. A method in accordance with claim 12, wherein packet data units for a particular radio bearer having an assigned count value, which is less than the determined value of the count included as part of either the connection reconfiguration complete message, or as part of received PDCP Control PDU, for the particular radio bearer will use an earlier set of security keys, and wherein packet data units for a particular radio bearer having an assigned count value, which is greater than or equal to the determined value of the count included as part of either the connection reconfiguration complete message, or as part of received PDCP Control PDU for the particular radio bearer will use a new set of security keys, which were derived as part of applying the requested changes to the subset of radio bearers.

14. A method in accordance with claim 12, wherein as part of applying the requested changes to the subset of radio bearers, buffers related to a hybrid automatic repeat request for radio bearers for which a change of security keys have been requested will not be flushed.

15. A method in accordance with claim 1, wherein the connection reconfiguration message is at least one of (a) received as part of a secondary node change, (b) received as part of a bearer type change, or (c) received in response to a detected count wrap around.

16. A user equipment having a communication connection including a plurality of radio bearers with a communication network, the user equipment comprising:
   a transceiver that receives a connection reconfiguration message, which identifies bearer specific changes to be made to a subset of radio bearers including less than all of the plurality of radio bearers, that impact the security keys being used by the subset of radio bearers, where the connection reconfiguration message includes a bearer identification field and a NH chaining counter (NCC) that identifies the radio bearers included in the subset; and
   a controller that applies the requested changes to the subset of radio bearers associated with the bearer identification field without resetting the communication connection with the communication network.

17. A user equipment in accordance with claim 16, wherein each radio bearer is associated with a packet data convergence protocol entity, where as part of applying the requested changes to the subset of radio bearers, a packet data convergence protocol entity derives a new set of keys to be used in place of an earlier set of keys.

18. A user equipment in accordance with claim 16, wherein a count value or sequence number of a first packet (PDCP PDU) is determined by the transmitting PDCP entity and then this count value or sequence number is signaled to the receiving PDCP entity either in the reconfiguration complete message or using a separate PDCP Control PDU;
   where packet data units for a particular radio bearer having an assigned count value, which is less than the determined value of the count included as part of the connection reconfiguration complete message for the particular radio bearer will use an earlier set of security keys; and
   where packet data units for a particular radio bearer having an assigned count value, which is greater than or equal to the determined value of the count included as part of the connection reconfiguration complete message for the particular radio bearer will use a new set of security keys, which were derived as part of applying the requested changes to the subset of radio bearers.

19. A user equipment in accordance with claim 16, further comprising one or more buffers associated with the communication connection, wherein each of the one or more buffers are associated with at least some of the plurality of radio bearers, and wherein when applying the requested changes to the subset of radio bearers, at least some of the contents of at least some of the buffers associated with the subset of radio bearers for which a reconfiguration has been requested are maintained.

* * * * *